United States Patent
Bryan et al.

(10) Patent No.: US 10,953,756 B2
(45) Date of Patent: Mar. 23, 2021

(54) ADAPTIVE REGENERATIVE BRAKING METHOD AND SYSTEM

(71) Applicant: FORD GLOBAL TECHNOLOGIES, LLC, Dearborn, MI (US)

(72) Inventors: Seth Anthony Bryan, Royal Oak, MI (US); Bryan Michael Bolger, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 638 days.

(21) Appl. No.: 14/800,061

(22) Filed: Jul. 15, 2015

(65) Prior Publication Data

US 2017/0015202 A1    Jan. 19, 2017

(51) Int. Cl.
*B60L 7/10*    (2006.01)
*B60L 7/18*    (2006.01)
(Continued)

(52) U.S. Cl.
CPC ............... *B60L 7/18* (2013.01); *B60K 6/445* (2013.01); *B60L 3/12* (2013.01); *B60L 53/00* (2019.02); *B60W 10/08* (2013.01); *B60W 10/184* (2013.01); *B60W 20/12* (2016.01); *B60W 20/14* (2016.01); *B60W 30/18127* (2013.01); *B60K 6/22* (2013.01); *B60W 20/00* (2013.01); *B60W 2540/10* (2013.01); *B60W 2540/12* (2013.01); *B60W 2552/00* (2020.02); *B60W 2554/00* (2020.02); *B60W 2555/60* (2020.02);
(Continued)

(58) Field of Classification Search
CPC ......... B60W 30/18127; B60W 10/184; B60W 50/0097; B60W 20/12; B60W 10/08; B60W 20/14; B60W 2710/08; B60W 20/00; B60L 53/00; B60L 7/10; B60L 7/18; B60L 3/12; B60K 6/445; B60K 6/22; Y02T 10/70; Y02T 10/62; Y02T 10/7072; Y02T 90/14; Y10S 903/947
USPC ..... 701/22, 70, 78, 88; 903/902; 180/65.285
See application file for complete search history.

(56) References Cited

U.S. PATENT DOCUMENTS 6,588,860 B2    7/2003    Kosik et al.
8,543,273 B2    9/2013    Pfefferl
(Continued)

FOREIGN PATENT DOCUMENTS

| CN | 104285336 | | 1/2015 | |
| CN | 104742905 A | * | 7/2015 | ............ B60W 10/08 |

(Continued)

OTHER PUBLICATIONS

A calculation of predicting the expected life of super-capacitor following current pattern of railway vehicles; Jong-Yoon Kim; Su-Jin Jang; Byoung-Kuk Lee; Chung-Yuen Won; Chang-Mu Lee; 2007 7th Internatonal Conference on Power Electronics; Year: 2007 pp. 978-983, DOI: 10.1109/ICPE.2007.4692529.*

(Continued)

*Primary Examiner* — Cuong H Nguyen
(74) *Attorney, Agent, or Firm* — David Kelley, Esq.; Carlson, Gaskey & Olds, P.C.

(57) ABSTRACT

An exemplary braking method includes monitoring for an upcoming deceleration of an electrified vehicle, permitting an amount of regenerative braking if the upcoming deceleration is detected, and reducing the amount of regenerative braking if the upcoming deceleration is not detected.

10 Claims, 4 Drawing Sheets

(51) Int. Cl.

| | |
|---|---|
| *B60L 3/12* | (2006.01) |
| *B60W 30/18* | (2012.01) |
| *B60W 20/12* | (2016.01) |
| *B60W 20/14* | (2016.01) |
| *B60K 6/445* | (2007.10) |
| *B60W 10/184* | (2012.01) |
| *B60W 10/08* | (2006.01) |
| *B60L 53/00* | (2019.01) |
| *B60K 6/22* | (2007.10) |
| *B60W 20/00* | (2016.01) |

(52) U.S. Cl.
CPC ..... *B60W 2710/08* (2013.01); *B60W 2710/18* (2013.01); *B60Y 2200/92* (2013.01); *B60Y 2300/89* (2013.01); *Y02T 10/62* (2013.01); *Y02T 10/70* (2013.01); *Y02T 10/7072* (2013.01); *Y02T 90/14* (2013.01); *Y10S 903/947* (2013.01)

(56) References Cited

U.S. PATENT DOCUMENTS

| | | | | |
|---|---|---|---|---|
| 8,570,000 | B2* | 10/2013 | Hori | B60W 10/26 320/104 |
| 9,246,417 | B1* | 1/2016 | Connolly | H02P 3/14 |
| 9,371,061 | B2* | 6/2016 | Kim | B60L 15/2009 |
| 9,605,614 | B2* | 3/2017 | Miura | B60W 10/06 |
| 9,827,955 | B2* | 11/2017 | Miller | B60L 7/18 |
| 10,155,447 | B2* | 12/2018 | Imanishi | B60T 13/585 |
| 10,239,526 | B2* | 3/2019 | Durgin | B60W 30/16 |
| 10,339,400 | B1* | 7/2019 | Chai | G06K 9/00825 |
| 10,675,986 | B2* | 6/2020 | Sano | B60W 30/18127 |
| 2008/0265662 | A1* | 10/2008 | Karnjate | B60T 7/06 180/65.27 |
| 2013/0204472 | A1* | 8/2013 | Pfefferl | B60T 1/10 701/22 |
| 2014/0379190 | A1* | 12/2014 | Sawada | B60T 1/10 701/22 |
| 2015/0019058 | A1* | 1/2015 | Georgiev | B60L 7/18 701/22 |
| 2015/0183433 | A1* | 7/2015 | Suzuki | B60W 10/08 701/96 |
| 2015/0217643 | A1* | 8/2015 | Lee | B60L 7/10 701/22 |
| 2016/0318501 | A1* | 11/2016 | Oldridge | B60L 15/2045 |
| 2017/0015202 | A1* | 1/2017 | Bryan | B60L 7/18 |
| 2018/0134161 | A1* | 5/2018 | Gaither | B60L 3/0076 |
| 2018/0215272 | A1* | 8/2018 | Vitullo | B60L 58/12 |

FOREIGN PATENT DOCUMENTS

| | | | | | |
|---|---|---|---|---|---|
| DE | 102014118636 | A1 | * | 7/2015 | ............ B60W 10/06 |
| JP | PCT/JP2013/051373 | | * | 7/2014 | ................ B60T 1/00 |
| JP | 2015123831 | A | * | 7/2015 | ............ B60W 10/08 |

OTHER PUBLICATIONS

Fuel cell hybrid locomotives: applications and benefits; A. R. Miller; J. Peters; Proceedings of the 2006 IEEE/ASME Joint Rail Conference; Year: 2006; pp. 287-293, DOI: 10.1109/RRCON.2006. 215320.*

Electric vehicle braking by fuzzy logic control; J. Paterson; M. Ramsay; Conference Record of the 1993 IEEE Industry Applications Conference Twenty-Eighth IAS Annual Meeting; Year: 1993; pp. 2200-2204 vol.3, DOI: 10.1109/IAS.1993.299173.*

Improvement of drive range, acceleration and deceleration performance in an electric vehicle propulsion system; X. Yan; D. Patterson; 30th Annual IEEE Power Electronics Specialists Conference. Record. (Cat. No.99CH36321) ; Year: 1999, vol. 2 pp. 638-643 vol.2, DOI: 10.1109/PESC.1999.785576.*

Supercapacitor-based optimum switched reluctance drive for advanced electric vehicles; Ge Baoming; A. T. de Almeida; F. J. T. E. Ferreira; 2005 International Conference on Electrical Machines and Systems; Year: 2005, vol. 1; pp. 822-827 vol. 1, DOI: 10.1109/ICEMS.2005. 202652.*

Hybrid energy storage systems and battery management for electric vehicles; Sangyoung Park; Younghyun Kim; Naehyuck Chang 2013 50th ACM/EDAC/IEEE Design Automation Conference (DAC); Year: 2013; pp. 1-6.*

Analysis of Regenerative Braking Effect for E-REV Bus According to Driving Cycle Based on Simulation;Jongdae Choi; Jongryeol Jeong; Suk Won Cha; Yeong-il Park; 2014 IEEE Vehicle Power and Propulsion Conference (VPPC); Year: 2014; pp. 1-5, DOI: 10.1109/ VPPC.2014.7007020.*

Analysis of Regenerative Braking Effect for E-REV Bus According to Driving Cycle Based on Simulation; Jongdae Choi;Jongryeol Jeong;Suk Won Cha;Yeong-il Park; 2014 IEEE Vehicle Power and Propulsion Conference (VPPC); IEEE Conference Paper. (Year: 2014).*

Novel Ergonomic Regenerative Braking System for an Electric Motorcycle; Jonathan Nadeau;Felix-Antoine Lebel;Pascal Messier; Joao Pedro Trovao;Alain Desrochers; 2018 IEEE Vehicle Power and Propulsion Conference (VPPC); IEEE Conference Paper. (Year: 2018).*

Improving the Single-Pedal Control Concept, Tesla Motors online forum discussion, Jul. 2013, retrieved at http://my.teslamotors.com/ forum/forums/improving-singlepedal-control-concept-idea-stolen-bmw-i3.

* cited by examiner

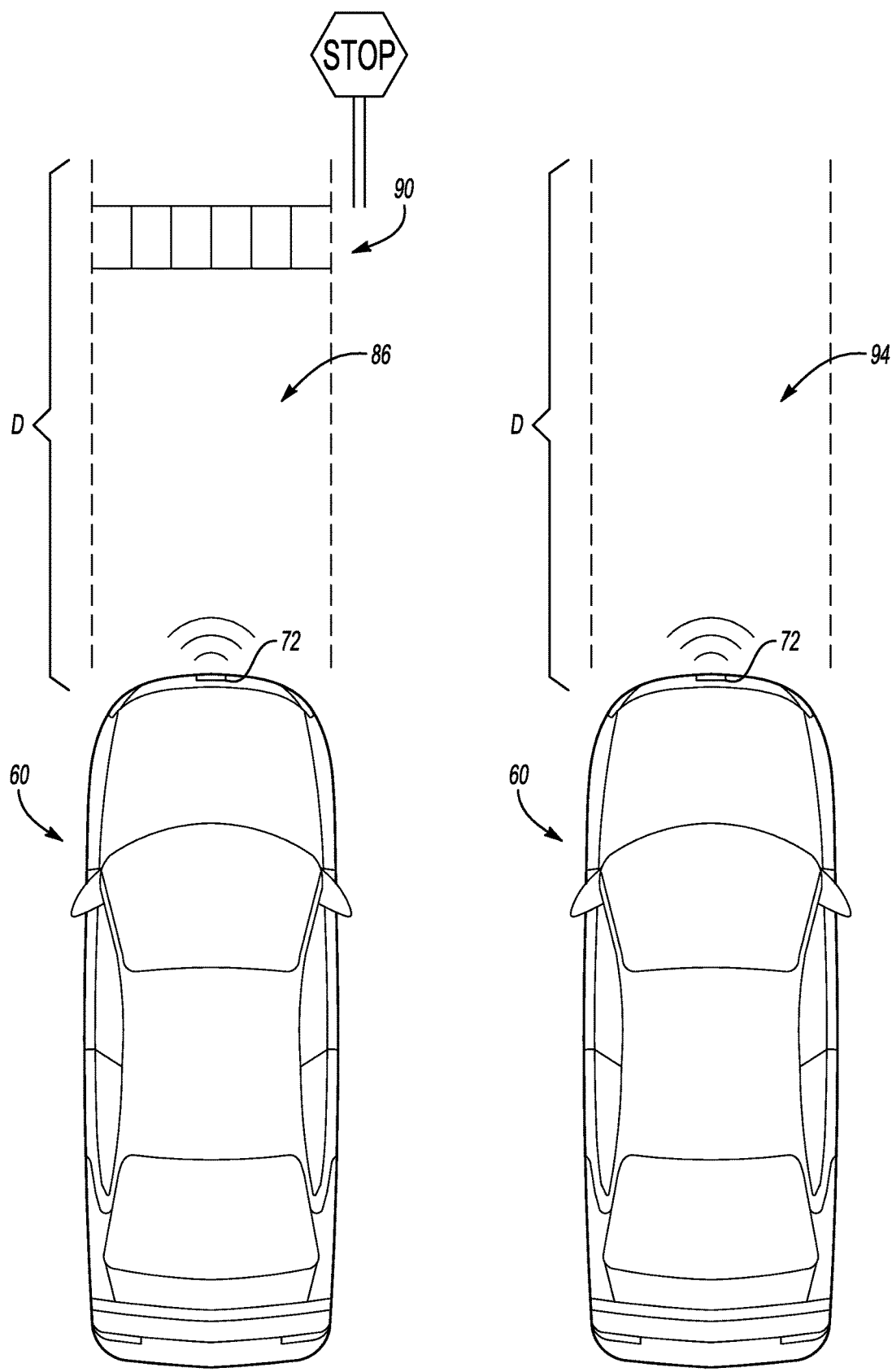

ADAPTIVE REGENERATIVE BRAKING METHOD AND SYSTEM

TECHNICAL FIELD

This disclosure relates to controlling regenerative braking to improve efficiency of an electrified vehicle.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Applying a brake torque can decelerate an electrified vehicle. The brake torque can include some brake torque from friction braking and some brake torque from regenerative braking. Friction braking and unnecessary or excessive regenerative braking can decrease fuel economy in electrified vehicles.

SUMMARY

A braking method according to an exemplary aspect of the present disclosure includes, among other things, permitting an amount of regenerative braking in an electrified vehicle if an upcoming deceleration is detected, and reducing the amount of regenerative braking if the upcoming deceleration is not detected.

In further non-limiting embodiment of the foregoing method, the method further comprises monitoring to detect the upcoming deceleration, wherein the monitoring is based at least in part on information provided by an object detection system.

In further non-limiting embodiment of any of the foregoing methods, the monitoring is based at least in part on the object detection system providing an indication of an object in a predicted path of the electrified vehicle.

In further non-limiting embodiment of any of the foregoing methods, the monitoring is based at least in part on the object detection system providing an indication of a traffic signal signifying a required deceleration of the electrified vehicle, a stop sign, or some combination of these.

In further non-limiting embodiment of any of the foregoing methods, the reducing is further in response to accelerator pedal depressed less than a threshold amount.

In further non-limiting embodiment of any of the foregoing methods, the reducing comprises preventing regenerative braking.

In further non-limiting embodiment of any of the foregoing methods, the method includes optionally disabling the reducing.

In further non-limiting embodiment of any of the foregoing methods, the method includes increasing regenerative braking to reduce friction braking if the upcoming deceleration is detected.

In further non-limiting embodiment of any of the foregoing methods, the method includes applying regenerative braking when a brake pedal is not depressed in response to the upcoming deceleration being detected.

In further non-limiting embodiment of any of the foregoing methods, amount of regenerative braking is an amount of regenerative braking torque.

An adaptive regenerative braking system according to another exemplary aspect of the present disclosure includes, among other things, a monitoring assembly; and a regenerative braking assembly that applies more regenerative braking torque when an upcoming deceleration is detected by the monitoring assembly than when the upcoming deceleration is not detected is not detected by the monitoring assembly.

In a further non-limiting embodiment of the foregoing system, the monitoring assembly comprises an object detection assembly.

In a further non-limiting embodiment of any of the foregoing systems, the monitoring assembly detects an upcoming deceleration at least in part in response to an indication of an object in a predicted path of an electrified vehicle.

In a further non-limiting embodiment of any of the foregoing systems, the regenerative braking torque comprises a lift pedal regenerative braking torque.

In a further non-limiting embodiment of any of the foregoing systems, the regenerative braking assembly applies no regenerative braking torque when the upcoming deceleration is not detected.

In a further non-limiting embodiment of any of the foregoing systems, the regenerative braking assembly applies more regenerative braking torque when the upcoming deceleration is detected and an accelerator pedal of an electrified vehicle is not depressed than when the upcoming deceleration is not detected and the accelerator pedal depressed.

In a further non-limiting embodiment of any of the foregoing systems, the regenerative braking assembly comprises a controller configured to adjust regenerative braking torque An electrified vehicle assembly according to yet another exemplary aspect of the present disclosure includes, among other things, a monitoring assembly and a controller that controls regenerative braking by permitting a first amount of regenerative braking or a second amount of regenerative braking less than the first amount. The controller permits the first amount of regenerative braking when the monitoring assembly detects an upcoming deceleration. The controller permits the second amount of regenerative braking when the monitoring assembly does not detect the upcoming deceleration.

In a further non-limiting embodiment of the foregoing assemblies, the second amount of regenerative braking comprises no regenerative braking.

In a further non-limiting embodiment of the foregoing assemblies, the controller is configured to vary the first amount of regenerative braking, the second amount of regenerative braking, or both.

DESCRIPTION OF THE FIGURES

The various features and advantages of the disclosed examples will become apparent to those skilled in the art from the detailed description. The figures that accompany the detailed description can be briefly described as follows:

FIG. 3 illustrates the electrified vehicle of FIG. 2 approaching having a predicted path that includes an object.

FIG. 4 illustrates the electrified vehicle of FIG. 2 having a predicted path that does not include an object.

DETAILED DESCRIPTION

This disclosure is directed toward adapting regenerative braking to improve efficiencies in an electrified vehicle.

Some electrified vehicles implement relatively aggressive regenerative braking when a brake pedal and an accelerator pedal are not depressed. The regenerative braking slows the electrified vehicle at a faster rate than permitting the electrified vehicle to coast. Regenerative braking introduces losses associated with, among other things, moving energy to and from a traction battery.

A driver of an electrified vehicle is often unable to optimize regenerative braking to reduce these inefficiencies. This disclosure provides a method and system for optimizing regenerative braking. The method and system adjusts regenerative braking in response to information from an object detection system.

Figure 1:
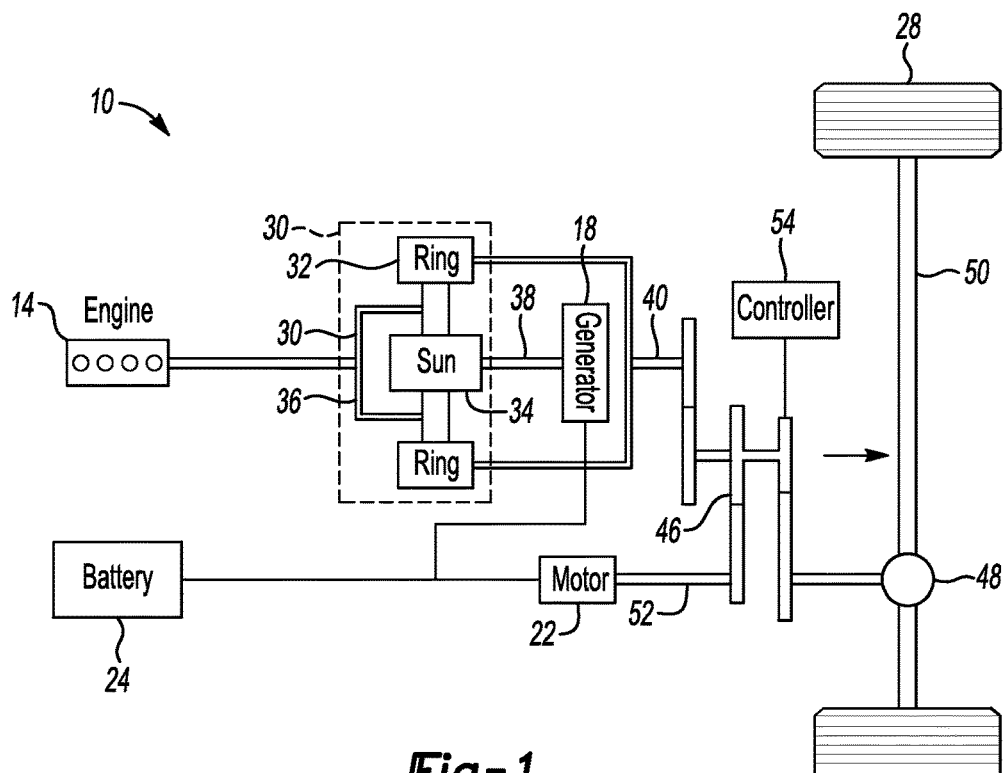
FIG. 1 illustrates a highly schematic view of an example powertrain for an electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles, and battery electrified vehicles (BEVs).

In this embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle battery assembly. The battery pack 24 may have the form of a high voltage battery that is capable of outputting electrical power to operate the motor 22 and the generator 18. Other types of energy storage devices and/or output devices can also be used with the electrified vehicle having the powertrain 10.

A controller 54 is operatively connected to portions of the example powertrain 10. The controller 54 can adjust the level of regenerative braking. In this example, the controller 54 can selectively reduce or eliminate regenerative braking during some operating conditions of the powertrain 10, and can increase the regenerative braking during other operating conditions of the powertrain. The powertrain 10 is in a coast (or sail) mode when the controller 54 eliminates regenerative braking.

The controller 54 is a type of regenerative braking assembly that can be actuated to vary an amount of regenerative braking, and specifically regenerative braking torque. An amount of regenerative braking can adjusted purely via control of torque by varying a regenerative braking torque request.

Other regenerative braking assemblies are possible in other examples, such as a clutch that physically toggles between different transmission states. The clutch, for example, could selectively engage or disengage the gears 46. In the engaged position, regenerative braking torque can transmit through the differential 48 to the first drive system, the second drive system, or both. In the disengaged position, regenerative braking torque cannot transmit through the differential 48 to the first drive system, the second drive system, or both.

Figure 2:
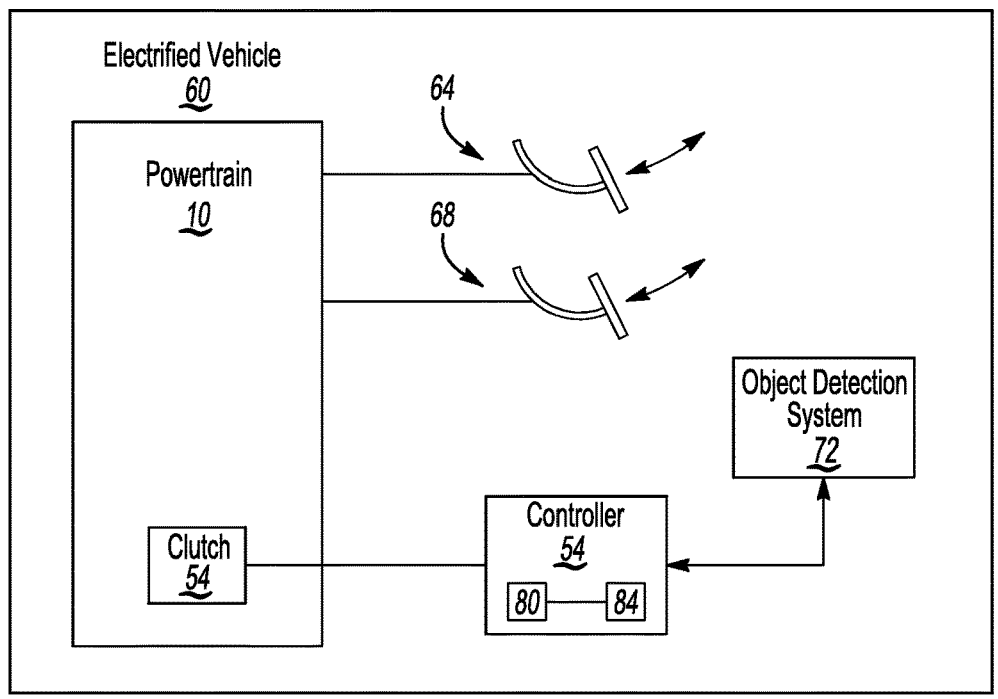
FIG. 2 illustrates a schematic view of an electrified vehicle incorporating the powertrain of FIG. 1.

Referring now to FIG. 2 with continuing reference to FIG. 1, an example electrified vehicle 60 includes the powertrain 10, a brake pedal 64, an accelerator pedal 68, an object detection system 72, and the controller 54.

Regenerative braking, friction braking, or both can be used to slow the vehicle wheels 28 and thus the vehicle 60. In this example, regenerative braking slows the vehicle 60 using the generator 18 and the motor 22. Friction braking slows the vehicle 60 by converting kinetic energy into heat energy via friction brakes.

When the vehicle 60 is moving, a driver can depress the brake pedal 64 to initiate a vehicle braking request that decelerates the vehicle 60. If the controller 54 prevents regenerative braking, friction braking can slow the vehicle. If the controller 54 permits regenerative braking, both regenerative braking and friction braking can slow the vehicle 60. For example, when the controller 54 permits regenerative braking, a relatively light press on the brake pedal 64 can initiate regenerative braking. Pressing the brake pedal 64 more firmly can slow the vehicle drive wheels 28 using friction braking.

When the brake pedal 64 is not depressed, the driver can depress the accelerator pedal 68 to cause the powertrain 10 to rotate the vehicle drive wheels 28 to move the vehicle 60.

If the accelerator pedal 68 is depressed, lifting off the accelerator pedal 68 can slow the vehicle drive wheels 28. If the controller 54 permits regenerative braking, lifting off the accelerator pedal 68 can initiate regenerative braking. If the controller 54 prevents regenerative braking, lifting off the accelerator pedal 68 can cause the vehicle 60 to coast.

Regenerative braking can generate power for the battery pack 24. However, losses associated with moving power to and from the battery pack 24 can be introduced. The object detection system 72 provides an input to the controller 54 that the controller 54 uses to reduce these losses.

In particular, the example controller 54 adjusts regenerative braking based on information from the object detection system 72. This adjustment provides the vehicle 60 with an adaptive regenerative braking strategy. The controller 54 can, for example, selectively adjust regenerative braking in response to information from the object detection system 72.

The adaptive regenerative braking strategy can be user selectable. That is, the user can activate or deactivate the adaptive regenerative braking strategy through a user-interface, for example. When the adaptive regenerative braking strategy is deactivated, the vehicle 60 employs a standard regenerative braking strategy where regenerative braking is not adjusted based on information from the object detection system 72.

The information provided by the object detection system 72 is utilized to determine if regenerative braking can be reduced or eliminated during some portions of a drive cycle. During a drive cycle, under operating conditions where regenerative braking is not required, regenerative braking is reduced or eliminated to avoid losses associated with regenerative braking.

For example, the electrified vehicle 60 typically needs to decelerate or stop if an object resides in a predicted path of travel for the vehicle 60. If the object detection system 72 detects an object in a predicted path of travel for the vehicle 60, the controller 54 permits regenerative braking so that regenerative braking will start when the driver lifts off the accelerator pedal 68. However, if the object detection system 72 does not detect an object in the predicted path of travel for the vehicle 60, the controller 54 prevents regenerative braking so that regenerative braking will not start when the driver lifts off of the accelerator pedal 68. Instead, when the controller 54 prevents regenerative braking, lift off of the accelerator pedal 68 will cause the vehicle 60 to enter the coast mode.

The example object detection system 72 is a frontward object detection system. The object detection system 72 can be radar based, lidar-based, camera-based, some combination of these, or some other system capable of detecting objects in a predicted path of travel. The object detection system could be a backward object detection system if the vehicle 60 is in a reverse gear and the predicted path of travel is behind the vehicle 60.

The object detection system 72 is operably coupled to the controller 54. The object detection system 72 provides data to the controller 54 that can be analyzed by the controller 54 to determine if an object is in the predicted path of travel for the vehicle 60.

The example controller 54 includes a processor 80 operatively linked to a memory portion 84. The example processor 80 is programmed to execute a program stored in the memory portion 84. The program may be stored in the memory portion 84 as software code.

The program stored in the memory portion 84 may include one or more additional or separate programs, each of which includes an ordered listing of executable instructions for implementing logical functions. The instructions enable the controller 54 to adjust between first and second amounts of regenerative braking. The second amounts are less than the first amounts.

Referring now to FIG. 3 with continuing reference to FIG. 2, a predicted path 86 extends forwardly from the vehicle 60 when the vehicle 60 is moving. The predicted path 86 represents the predicted trajectory for the vehicle 60 and can be based on information collected by the object detection system 72, such as a path of a roadway that the vehicle 60 is travelling.

The object detection system 72 monitors an area of the predicted path 86 extending a distance D from the vehicle 60. The distance D can be calibratable. That is, the user can adjust the distance D through the user-interface, for example.

A stop 90 is positioned within the predicted path 86. The object detection system 72 detects the stop 90 and provides information to the controller 54 about the stop 90. To avoid driving past the stop 90 without stopping, the vehicle 60 needs to begin braking in advance of the stop 90, the controller 54 can adjust regenerative braking, if required, to ensure that at least some of the braking will be regenerative braking. The controller 54 and the object detection system 72 thus work together as a monitoring assembly that monitors for upcoming decelerations of the vehicle 60.

The stop 90 is type of object that can be recognized by the object detection system 72. In this example, the stop 90 includes both a crosswalk and a stop sign. The stop sign, crosswalk, or both, may include characteristics that the object detection system 72 can recognize as a stop. In another example, the stop 90 is a vehicle that is moving or parked in the predicted path 86 within the distance D from the vehicle 60. In still other examples, the stop 90 is a traffic light or a type of road sign other than a stop sign.

Referring now to FIG. 4 with continuing reference to FIG. 2, a predicted path 94 extends forwardly from the vehicle 60 when the vehicle 60 is moving. The object detection system 72 detects no objects in the predicted path 94 within the distance D from the vehicle 60.

The object detection system 72 provides information to the controller 54 indicating that no upcoming decelerations are required due to an object within the distance D. The controller 54 interprets this information as meaning that no stops are required within the distance D. Since no stops are required due to an object within the distance D, the controller 54 prevents regenerative braking. This ensures that lift off of the accelerator pedal 68 will result in the vehicle 60 entering the coast mode rather than regenerative braking. The controller 54 could also reduce regenerative braking when no stops are required due to an object within the distance D rather than causing the vehicle 60 to fully enter the coast mode.

Of course, even when the controller 54 has reduced or eliminated regenerative braking, the driver can depress the brake pedal 64 to brake the vehicle 60 with friction braking.

Figure 5:
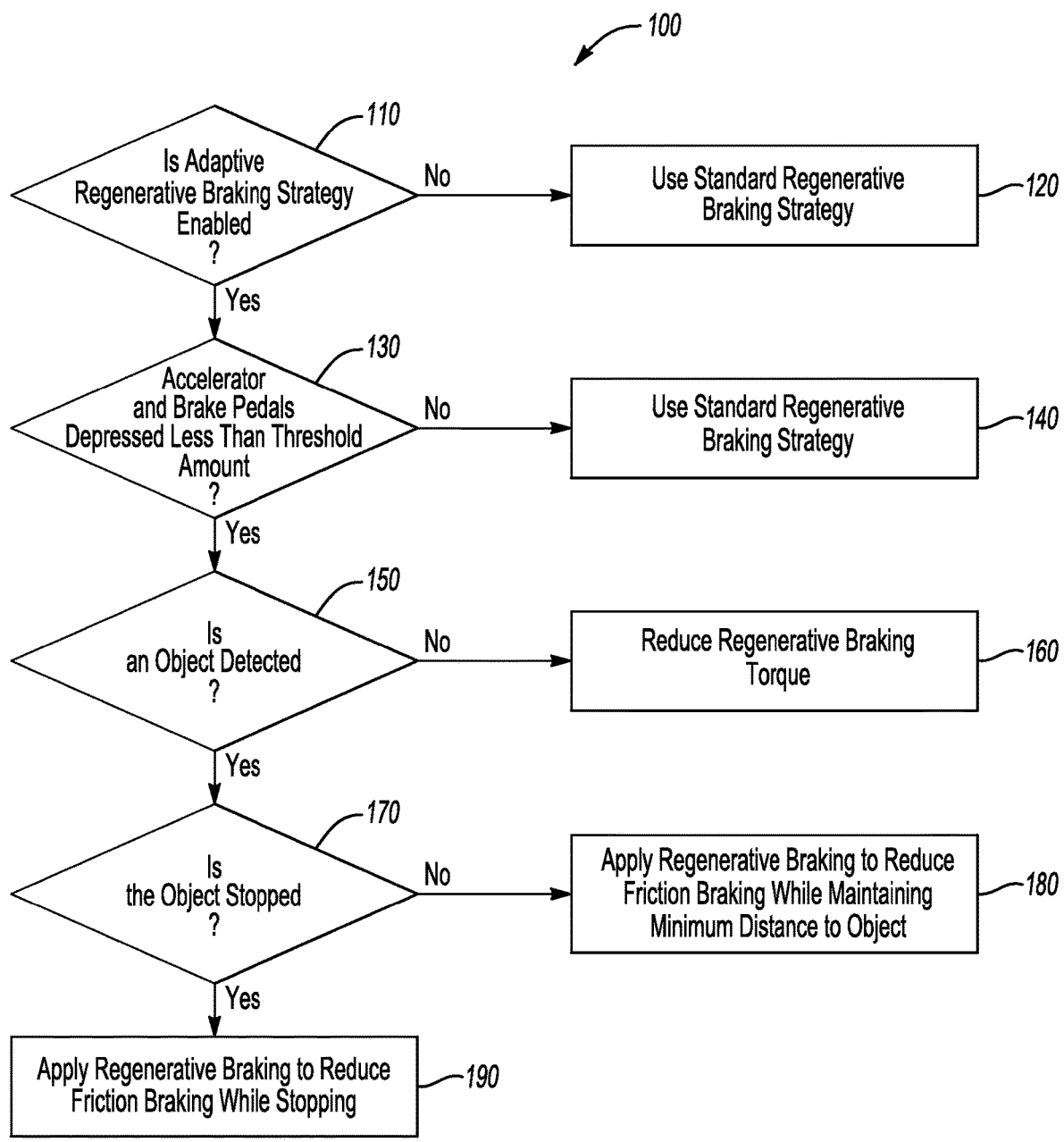
FIG. 5 illustrates a flow of an example adaptive regenerative braking method.

Referring to FIG. 5, an example adaptive regenerative braking method 100 includes a step 110 of calculating whether adaptive regenerative braking is enabled. Adaptive regenerative braking is a user-selectable option in this example. A driver of the vehicle 60 could choose to activate or deactivate adaptive regenerative braking due to driving preferences. The selection could be made via a user interface within the vehicle 60, such as a touch-screen interface.

If adaptive regenerative braking is not enabled, the method 100 moves to a step 120 and a standard regenerative braking method is applied. If adaptive regenerative braking is enabled, the method 100 moves to a step 130.

At the step 130, the method 100 calculates whether the accelerator pedal 68 and the brake pedal 64 are depressed less than a threshold amount. In some examples, the threshold amount is no depression of the accelerator pedal 68 and no depression of the brake pedal 64. If the accelerator pedal 68 and the brake pedal 64 are not depressed less than the threshold amount, the method 100 moves to the step 140 where the standard regenerative braking strategy is employed. At the step 140, no regenerative braking actions are taken since the accelerator pedal 68 is depressed more than the threshold amount, which means the driver wants the vehicle 60 move rather than decelerate.

If the accelerator pedal 68 and the brake pedal 64 are depressed less than the threshold amount, the method 100 moves to the step 150.

At the step 150, the method 100 calculates whether an object is detected. The object detection system 72 provides this information in this example.

If an object is not detected in the step 150, the method 100 moves to the step 160 where regenerative braking is reduced. At the step 160, regenerative braking can be disabled entirely by the controller 54.

Accordingly, the method 100 permits regenerative braking if an upcoming deceleration is detected and permits coasting of the vehicle 60 when no object is detected. Coasting the vehicle 60 can, in some examples, reduce unnecessary over-performance of regenerative braking and thus eliminate unnecessary energy conversion losses.

If an object is detected in the step 150, the method 100 moves to the step 170. At the step 170 the object detection system 72 detects whether the object is stopped or moving. If the object is a moving object that is moving away from the vehicle 60, such as when the vehicle 60 is approaching another moving vehicle traveling in the same direction as the vehicle 60, the method 100 moves to a step 180. If the object is a stationary object the method 100 moves to a step 190.

At the step 180, the method 100 can permit slowing the vehicle 60 using regenerative braking, which will reduce the friction braking required to maintain a distance between the vehicle 60 and the moving object.

If the driver has not depressed the accelerator pedal 68 or the brake pedal 64 at the step 180, the step 180 can include using changes in relative speed of the vehicle 60 and relative distances between the vehicle 60 and the object detected in the step 150. The changes can be used in the step 180 to identify potential hard or rapid brake request. The step 180 can mitigate hard or rapid braking by applying regenerative braking up to some maximum amount.

At the step 190, the method 100 can permit slowing the vehicle 60 using regenerative braking, which will reduce the friction braking required to bring the vehicle 60 to a stop before reaching the stationary object.

If the driver has not depressed the accelerator pedal 68 or the brake pedal 64 at the step 190, the step 190 can include the controller 54 calculating an amount of regenerative braking to use and an implementation of the regenerative braking that will recover a maximum amount of kinetic energy.

After the step 160, 180, or 190, the method 100 returns to the step 110 in response to, for example, the accelerator pedal 68 being depressed to accelerate the vehicle 60.

In some examples, the vehicle 60 includes a display, such as a graphical display, showing an amount of the regenerative braking usage over time. The display can further include an explanation of why regenerative braking is used at certain times. The display can say "object detected," for example.

Figure 6:
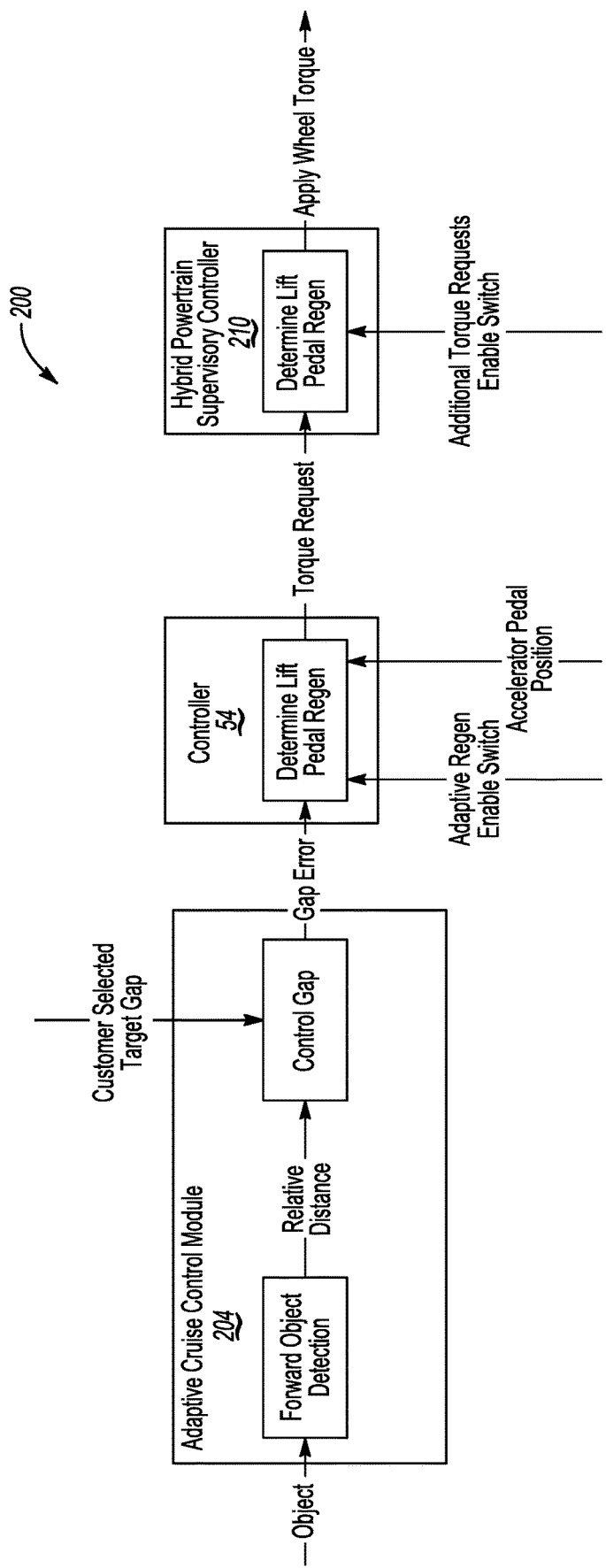
FIG. 6 illustrates a highly schematic view of an example control system of the electrified vehicle of FIG. 2.

Referring to FIG. 6 with reference to FIG. 2, an example control system 200 for the vehicle 60 includes and adaptive cruise control module 204 that uses frontward object detection, a relative distance between the vehicle 60 and another vehicle to maintain a control gap. A customer selected target gap may provide an input used to calculate the control gap.

Any difference between an actual gap and a control gap is communicated to the controller 54, which determines if lift pedal regenerative braking required to address the difference. The controller 54 can be used here to execute the step 180 of the method 100 in FIG. 5 to maintain the actual gap at the control gap.

If the electrified vehicle 60 needs to speed up to decrease the actual gap, the controller 54 can communicate a torque request to a hybrid powertrain supervisory controller 210, which controls the powertrain 10 to speed up the vehicle 60.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A braking method, comprising:
when an accelerator pedal and a brake pedal of an electrified vehicle are not depressed, permitting a first amount of regenerative braking in the electrified vehicle if an upcoming deceleration is detected; and
when the accelerator pedal and the brake pedal of the vehicle are not depressed, permitting a second amount of regenerative braking if the upcoming deceleration is not detected, the second amount less than the first amount, wherein the second amount is no regenerative braking.

2. The braking method of claim 1, further comprising monitoring to detect the upcoming deceleration, wherein the monitoring is based at least in part on information provided by an object detection system.

3. The braking method of claim 2, wherein the monitoring is based at least in part on the object detection system providing an indication of an object in a predicted path of the electrified vehicle.

4. The braking method of claim 2, wherein the monitoring is based at least in part on the object detection system providing an indication of a traffic signal signifying a required deceleration of the electrified vehicle, a stop sign, or some combination of these.

5. An electrified vehicle assembly, comprising:
a monitoring assembly; and
a controller that controls regenerative braking by permitting a first amount of regenerative braking when the accelerator pedal and the brake pedal are both not depressed or a second amount of regenerative braking less than the first amount when the accelerator pedal and the brake pedal are both not depressed, the controller permitting the first amount of regenerative braking when the monitoring assembly detects an upcoming deceleration, the controller permitting the second amount of regenerative braking when the monitoring assembly does not detect the upcoming deceleration, wherein the second amount of regenerative braking is no regenerative braking.

6. The electrified vehicle of claim 5, wherein the controller is configured to vary the first amount of regenerative braking, the second amount of regenerative braking, or both.

7. A braking method, comprising:
moving a pedal of a vehicle from a first pedal position to a second pedal position;
if an upcoming deceleration is detected, permitting a first amount of regenerative braking in the electrified vehicle when the pedal is in the second pedal position; and
if the upcoming deceleration is not detected, permitting a second amount of regenerative braking when the pedal is in the second pedal position, the second amount of regenerative braking less than the first amount of regenerative braking, wherein the second amount of regenerative braking is no regenerative braking.

8. The braking method of claim 7, wherein the pedal is an accelerator pedal of the vehicle, wherein the accelerator pedal in the first pedal position is depressed more than the accelerator pedal in the second pedal position.

9. The braking method of claim 7, wherein the pedal is a brake pedal, wherein the brake pedal is not depressed when in the first pedal position and depressed in the second pedal position.

10. The braking method of claim 1, wherein the first and second amounts of regenerative braking are amounts of regenerative braking torque.

\* \* \* \* \*